(12) United States Patent
Goff et al.

(10) Patent No.: US 7,668,615 B2
(45) Date of Patent: Feb. 23, 2010

(54) METHOD AND APPARATUS FOR RANDOMIZING DISPATCH ORDER FOR SINGLE WAFER PROCESSING

(75) Inventors: Gerald L. Goff, Austin, TX (US); Leslie Marshall, Austin, TX (US); Donald C. Likes, Austin, TX (US)

(73) Assignee: GlobalFoundries, Inc., Grand Cayman (KY)

( * ) Notice: Subject to any disclaimer, the term of this patent is extended or adjusted under 35 U.S.C. 154(b) by 199 days.

(21) Appl. No.: 11/866,060

(22) Filed: Oct. 2, 2007

(65) Prior Publication Data

US 2009/0088882 A1   Apr. 2, 2009

(51) Int. Cl.
*G06F 19/00* (2006.01)
*G06F 7/00* (2006.01)
(52) U.S. Cl. .................. 700/101; 700/99; 700/100; 700/112; 700/115; 700/222
(58) Field of Classification Search ........... 700/99–101, 700/108–110, 112, 114–115, 218, 222, 228; 414/217
See application file for complete search history.

(56) References Cited

U.S. PATENT DOCUMENTS

| | | | | |
|---|---|---|---|---|
| 5,153,841 A * | 10/1992 | Goff et al. | ..... | 700/228 |
| 5,924,833 A * | 7/1999 | Conboy et al. | ..... | 414/217 |
| 6,470,231 B1 * | 10/2002 | Yang et al. | ..... | 700/121 |
| 6,862,495 B2 * | 3/2005 | Kahn et al. | ..... | 700/218 |
| 6,871,113 B1 * | 3/2005 | Maxim et al. | ..... | 700/121 |
| 6,975,920 B2 * | 12/2005 | Kahn et al. | ..... | 700/218 |
| 7,051,250 B1 * | 5/2006 | Allen et al. | ..... | 714/708 |
| 7,239,930 B2 * | 7/2007 | Burda et al. | ..... | 700/100 |
| 7,296,103 B1 * | 11/2007 | Purdy et al. | ..... | 710/106 |
| 7,299,102 B2 * | 11/2007 | Ouchi | ..... | 700/105 |
| 7,299,106 B1 * | 11/2007 | Nicksic et al. | ..... | 700/121 |
| 2006/0045668 A1 * | 3/2006 | Grabowski | ..... | 414/217 |
| 2008/0147343 A1 * | 6/2008 | Good et al. | ..... | 702/82 |

* cited by examiner

*Primary Examiner*—Ramesh B Patel
(74) *Attorney, Agent, or Firm*—Williams, Morgan & Amerson, P.C.

(57) ABSTRACT

A method for dispatching wafers for processing in a tool includes identifying a queue of wafers available to be processed in the tool. One of the wafers is randomly selected based at least in part on a length of time each wafer has been in the queue. The selected wafer is dispatched for processing in the tool.

17 Claims, 5 Drawing Sheets

METHOD AND APPARATUS FOR RANDOMIZING DISPATCH ORDER FOR SINGLE WAFER PROCESSING

CROSS-REFERENCE TO RELATED APPLICATIONS

Not applicable.

BACKGROUND OF THE INVENTION

The disclosed subject matter relates generally to manufacturing and, more particularly, to a method and apparatus for randomizing dispatch order for single wafer processing.

A semiconductor fabrication facility typically includes numerous processing tools used to fabricate semiconductor devices. The processing tools may include photolithography steppers, etch tools, deposition tools, polishing tools, rapid thermal processing tools, ion implantation tools, and the like. Conventionally, wafers are grouped into lots (e.g., 25 wafers) housed in a common carrier. Wafer lots are processed in the tools, and each processing tool modifies the wafers according to a particular operating recipe so that a desired product is formed in or on the wafer. For example, a photolithography stepper may be used to form a patterned layer of photoresist above the wafer. Features in the patterned layer of photoresist correspond to a plurality of features, e.g. gate electrode structures, which will ultimately be formed above the surface of the wafer. When processing of the wafer is complete, the various features formed in or on the wafer, as well as features formed in or on layers that are deposited above the wafer, combined to form the desired product. Exemplary products include processors, memory elements, and the like.

During the flow of wafers through the fabrication facility, dispatch rules are typically employed to determine the processing order of the lots. Typical dispatch rules attempt to address queue times and priorities of the lots. For example, the lots waiting in the queue the longest are typically dispatched first. This dispatch technique is generally referred to as a first-in/first-out (FIFO) dispatch rule. However, in some cases the lots in the queue may have different priorities. In such cases a lot that has a higher priority (e.g., high value product lot, engineering lot, pilot lot, etc.) may be dispatched prior to a lot that has been in the queue longer, but has a lower priority.

Within a particular lot, wafers are typically identified, sorted, and randomized using a tool referred to as a wafer sorter. The wafer sorter shuffles the wafers periodically to reduce the likelihood that position oriented defects will be introduced in the wafers. If the wafers in the lot were to be processed in the same positions throughout the production flow, defects would typically compound, thereby reducing the yield of the devices.

As the diameter of the wafers has increased, tool manufacturers have moved away from batch processing (e.g., multiple wafers processed concurrently) toward single wafer processing. In a single wafer processing environment, lot based organizational techniques and dispatch rules are less useful. Moreover, wafer sorters are limited resources that have the potential to cause bottlenecks.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF THE INVENTION

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for dispatching wafers for processing in a tool. The method includes identifying a queue of wafers available to be processed in the tool. One of the wafers is randomly selected based at least in part on a length of time each wafer has been in the queue. The selected wafer is dispatched for processing in the tool.

Another aspect of the disclosed subject matter is seen in a manufacturing system including a tool operable to process wafers and a workflow unit. The workflow unit is operable to identify a queue of wafers available to be processed in the tool, randomly select one of the wafers based at least in part on a length of time each wafer has been in the queue, and dispatch the selected wafer for processing in the tool.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
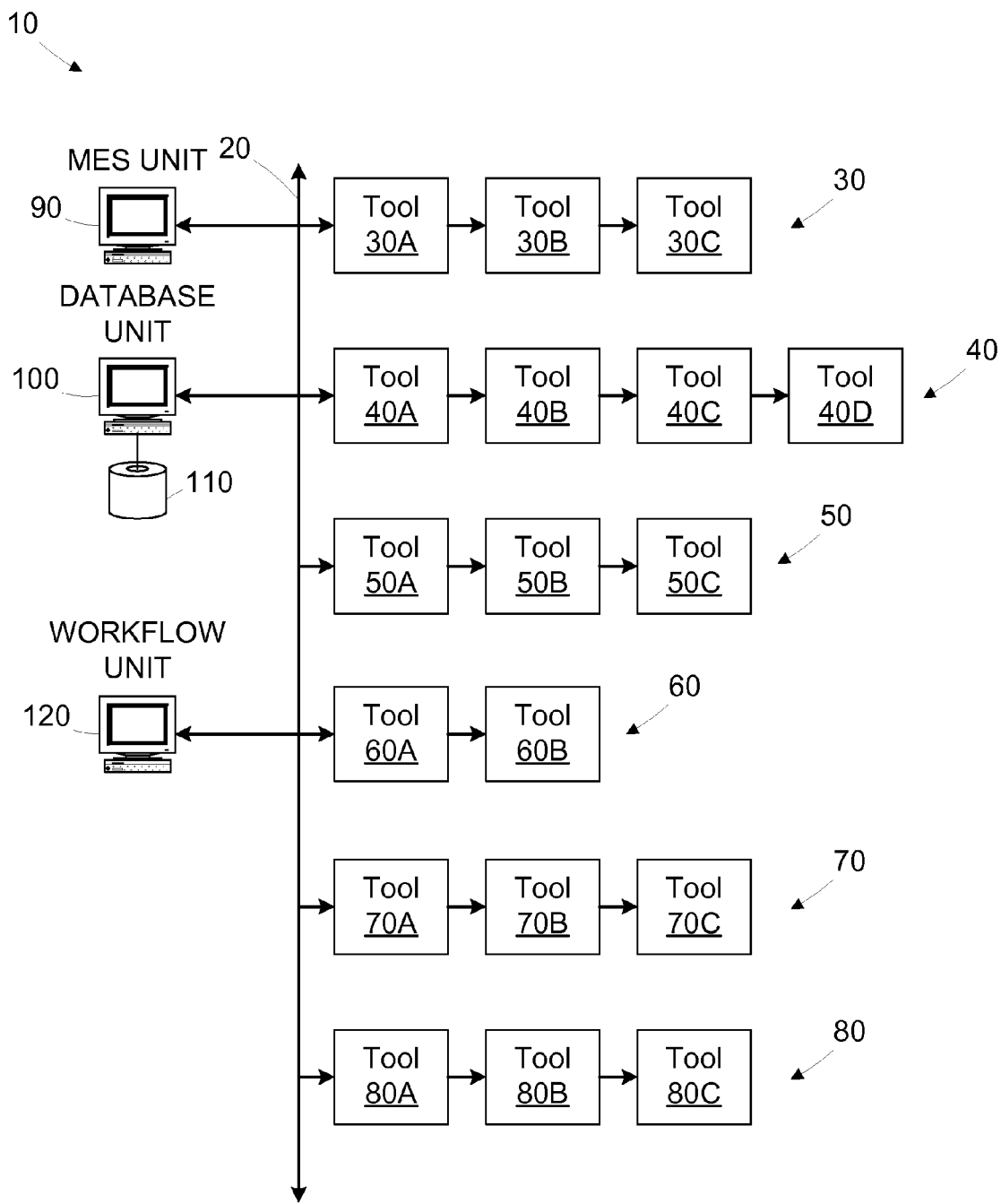
FIG. 1 is a simplified block diagram of a manufacturing system in accordance with one illustrative embodiment of the present invention.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION OF THE INVENTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the present invention shall be described in the context of an illustrative manufacturing system 10. The manufacturing system 10 includes a network 20, a plurality of tools 30-80, a manufacturing execution system (MES) unit 90, a database unit 100 and its associated data store 110, and a workflow unit 120.

In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

The network 20 interconnects various components of the manufacturing system 10, allowing them to exchange information. Each of the tools 30-80 may be coupled to a computer (not shown) for interfacing with the network 20. The tools 30-80 are grouped into sets of like tools, as denoted by lettered suffixes. For example, the set of tools 30A-30C represent tools of a certain type, such as a chemical mechanical planarization (CMP) tool.

In the illustrated embodiment, the manufacturing system 10 is organized as a single wafer processing system. Each processed in the system 10 is assigned a unique identification number (i.e., wafer ID). Fabrication processes are scheduled and tracked by the unique wafer ID numbers. This arrangement differs from conventional fabrication organizational schemes that group wafers into lots and track the fabrication process based on a lot identification number.

A particular wafer progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The tools 30-80 are illustrated in a rank and file grouping for illustrative purposes only. In an actual implementation, the tools 30-80 may be arranged in any physical order or grouping. Additionally, the connections between the tools in a particular grouping are meant to represent connections to the network 20, rather than interconnections between the tools 30-80.

The manufacturing execution system (MES) unit 90 directs the high level operation of the manufacturing system 10. The MES unit 90 monitors the status of the various entities in the manufacturing system 10 (i.e., wafers, tools 30-80) The database unit 100 stores data related to the status of the various entities and articles of manufacture in the process flow using one or more data stores 110. The data may include pre-process and post-process metrology data, tool states, priorities, etc.

The MES unit 90 stores information in the data store 110 related to the particular tools 30-80 (i.e., or sensors (not shown) associated with the tools 30-80) used to process each wafer. As metrology data is collected related to the wafer, the metrology data and a tool identifier indicating the identity of the metrology tool recording the measurements may also stored in the data store 110. The metrology data may include feature measurements, process layer thicknesses, electrical performance, surface profiles, etc. Data stored for the tools 30-80 may include chamber pressure, chamber temperature, anneal time, implant dose, implant energy, plasma energy, processing time, etc. Data associated with the operating recipe settings used by the tool 30-80 during the fabrication process may also be stored in the data store 110. For example, it may not be possible to measure direct values for some process parameters. These settings may be determined from the operating recipe in lieu of actual process data from the tool 30-80.

The workflow unit 120 controls the flow of articles of manufacture (e.g., semiconductor wafers) through the process flow, deciding the processing order, which articles are to be sampled by metrology tools 30-80, etc. Hence, the workflow unit 120 controls the queues for the processing and metrology resources in the manufacturing system 10. The workflow unit 120 can use various workflow management techniques, including dispatching, reservation management, etc., to control the flow of articles.

The distribution of the processing and data storage functions amongst the different computers 90, 100, 120, 130 is generally conducted to provide independence and a central information store. Of course, different numbers of computers and different arrangements may be used.

As will be described in greater detail below, the workflow unit 120 employs a randomization technique for dispatching wafers from a processing queue for the process tools 30-80. By including randomization in dispatching the wafers, the likelihood of defects being introduced or magnified due to the processing order of the wafers is reduced. Randomization also aids in the identification and classification of fault conditions or error signals.

Figure 2:
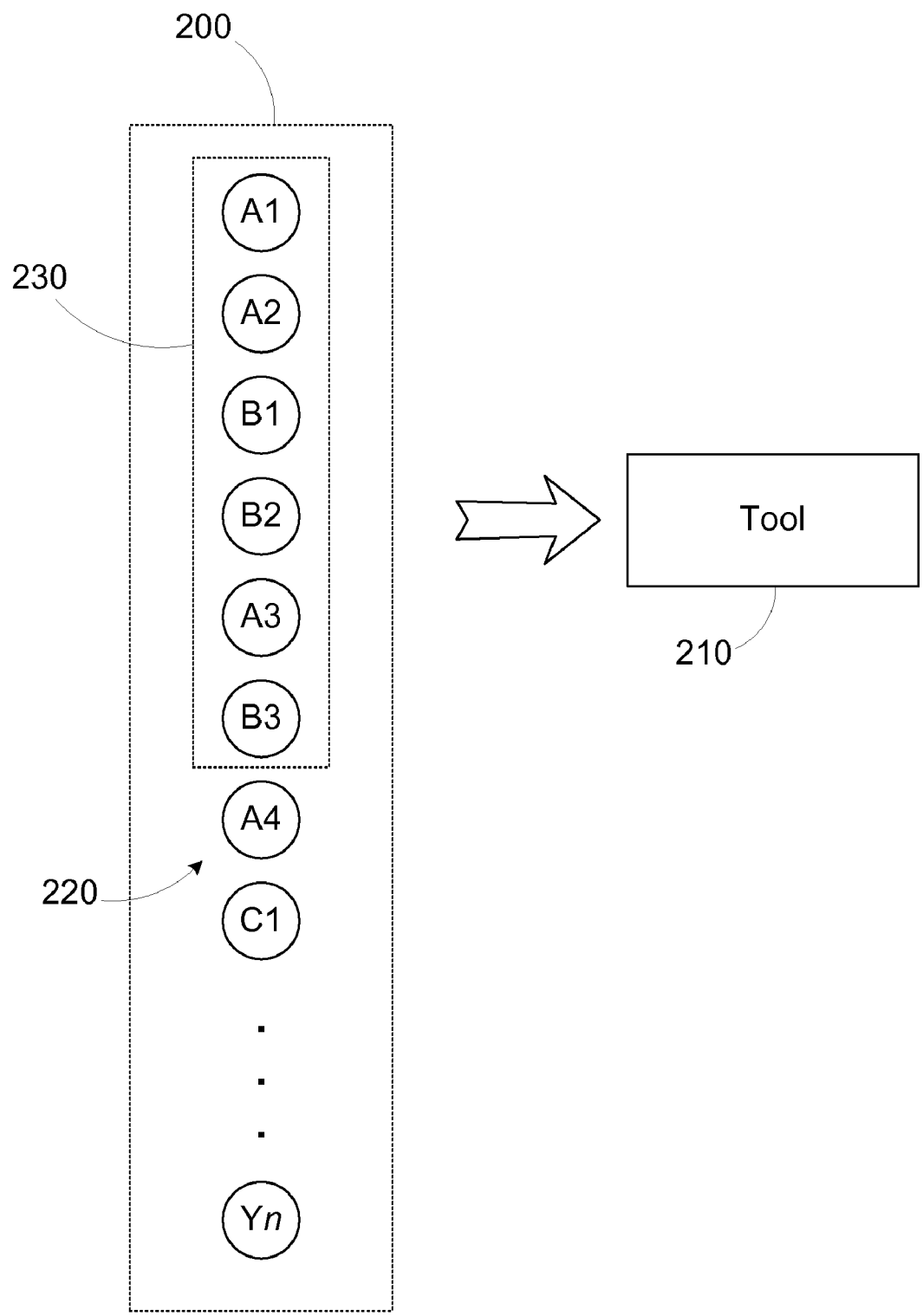
FIGS. 2-4 are simplified diagrams of a wafer queue to illustrate dispatch decisions for a tool.

FIG. 2 is a simplified diagram illustrating a wafer queue 200 for a tool 210 (e.g., one of the tools 30-80 of FIG. 1). At a particular point in time, a plurality of wafers 220 is in the queue 200. The wafers 220 enter the queue 200 as they have completed the previous fabrication step in the process flow. Typically, the wafers 220 enter the queue 200 at different times as they are transferred between the tools 30-80 after processing. For illustrative purposes, wafers 220 in the queue are designated by a letter and a number. The letter (e.g., A, B, C) designates a wafer type. The wafer type may relate to the type of device being fabricated on the wafer 220 and/or to the priority of the wafer 220. The number indicates the number of wafers 220 of the particular type in the queue 200. For example, wafers of type "C" may have a higher priority than wafers of type "A".

The queue 200 may represent wafers 220 that will be available for processing in the tool 210 within a particular time frame. The processing of a wafer 220 may be complete or nearing completion in the previous tool, or the wafer 220 may be in a transport device moving between tools or being held in a temporary storage location. Generally, it is assumed that wafers 220 in the queue 200 are available for dispatching to the tool 210. Some amount of transit time may be required for a dispatched wafer 220 to be actually received at the tool 210. Although the tool 210 is illustrated as a single tool 210, it is contemplated that the tool 210 may actually represent a tool family including multiple tools (e.g., 40A-40D) that may perform a similar function in the process flow.

In a first embodiment, the workflow unit 120 employs a time window technique for randomizing wafers 220 in the queue 200. The workflow unit 120 defines a window 230 including a group of wafers 220 that entered the queue 200 within a particular time interval. In one illustrated embodiment, the window 230 captures the oldest wafers 220 in the queue 200. Essentially, wafers 220 in the window 230 are assumed to have entered the queue 200 at the same time to allow randomization. The length of the time interval selected to define the window 230 may vary depending on the particular implementation. This approach attempts to implement a first-in/first-out (FIFO) type of approach with a randomization factor. The workflow unit 120 randomizes the order of wafers 220 within the window 230 for dispatch purposes.

Figure 3:
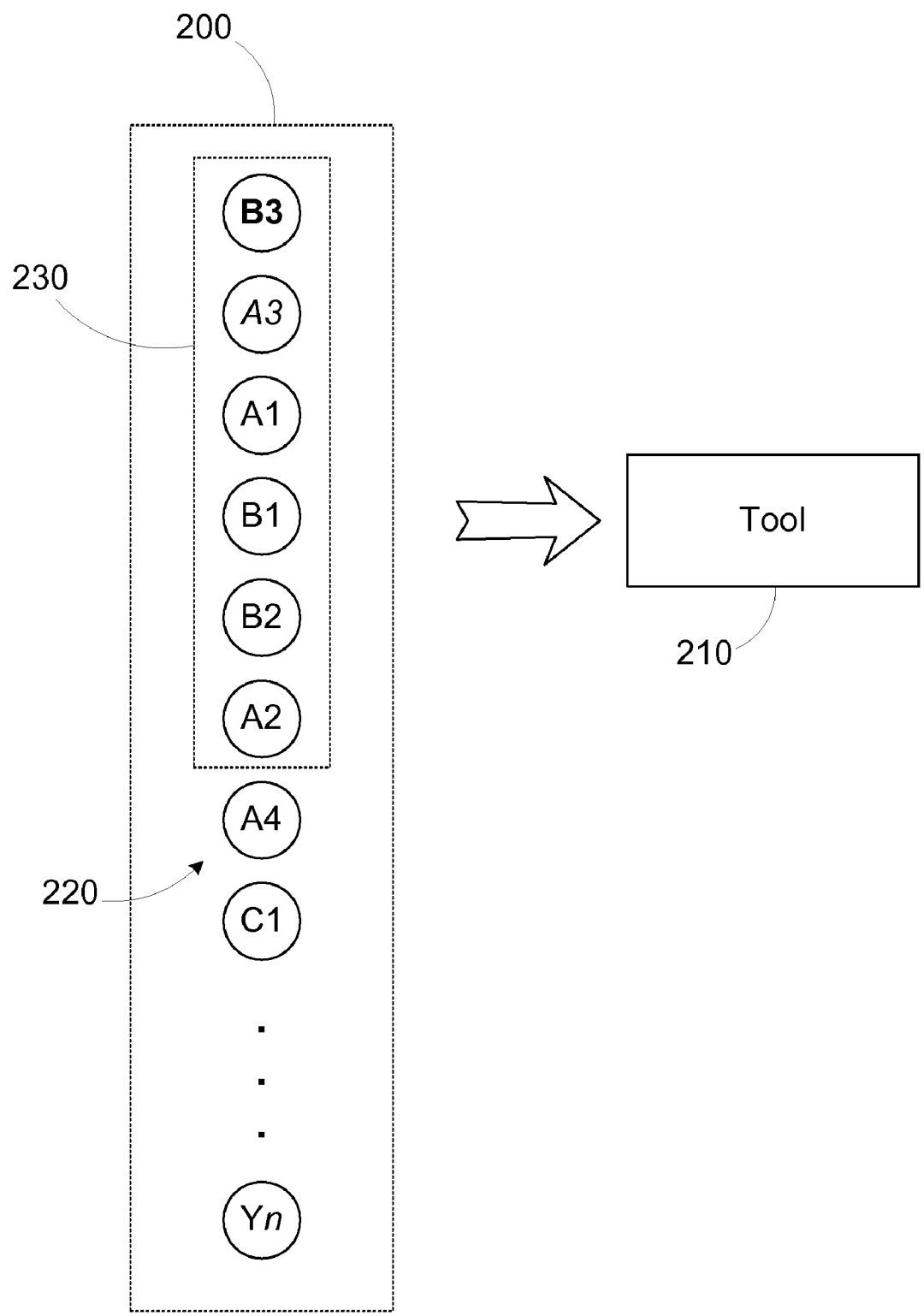

FIG. 3 illustrates the queue 200 after the randomization. Based on the randomized order, the workflow unit 120 dispatches wafer B3 to the tool 210 (i.e., as indicated in bold typeface). This approach essentially selects a random wafer from amongst those arriving at the queue 200 within the window 230. The window 230 definition and random selection may be repeated after each dispatch operation or after a predetermined number of dispatches.

This first simplified example illustrates a randomization technique that does not consider priority. However, it can be appreciated that conventional priority rules may be incorporated into this dispatch technique. For example, in a conventional dispatch scheme, a lot of wafers of type A may be dispatched prior to a lot of wafers of type B, even if the type B lot was in the queue longer than the type A lot. A similar approach may be applied to the randomized queue 200. For example, the relative priorities of the wafers 220 may cause wafer A3 to be dispatched prior to wafer B3 (i.e., as indicated in italics typeface). In this manner, the randomization may affect the apparent order of the wafers 220 in the queue from a FIFO point of view, but the priority selection rules may be implemented to favor the selection of a higher priority wafer 220.

Figure 4:
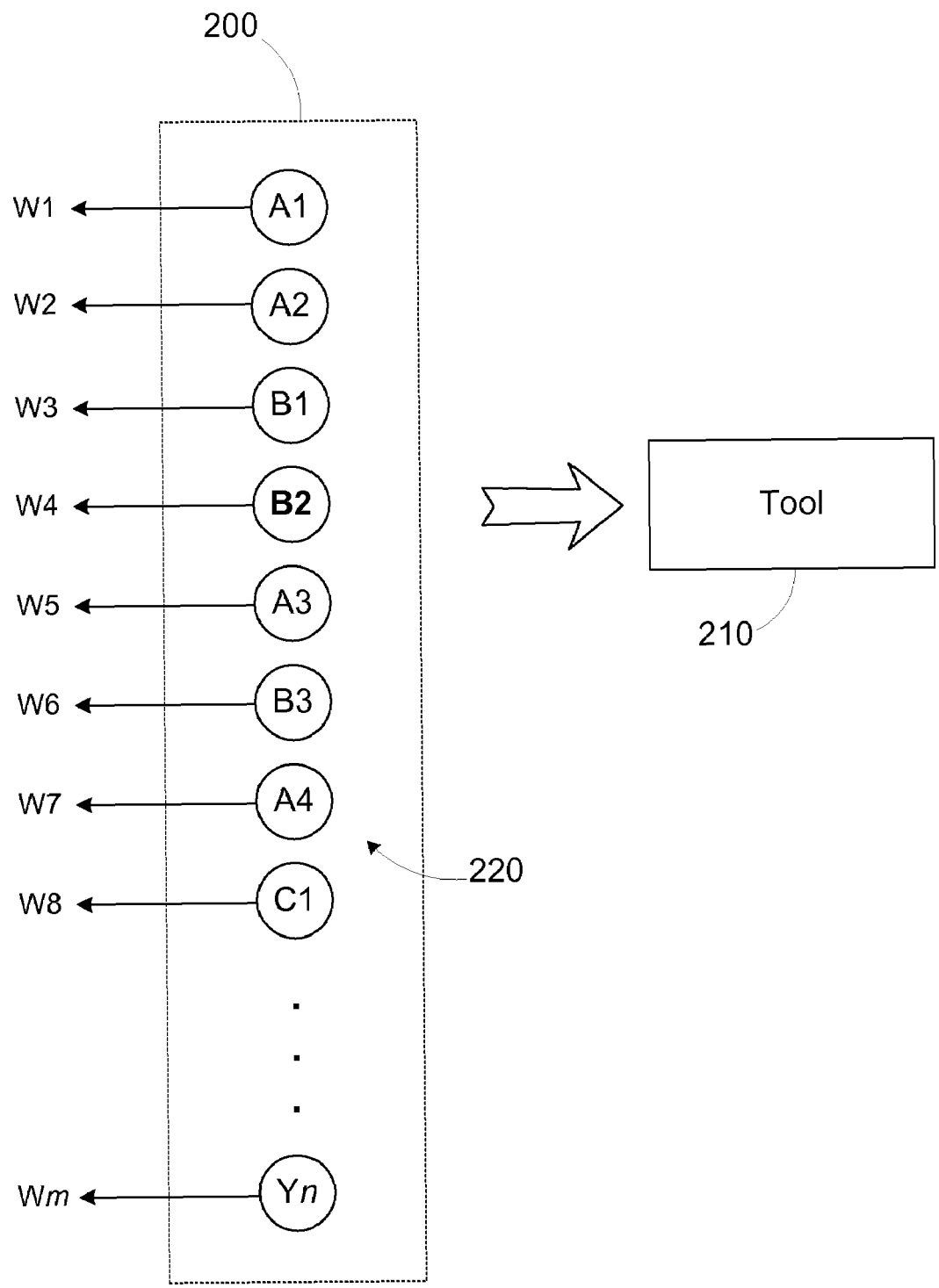

In another embodiment of the randomization technique, as illustrated with reference to FIG. 4, a weighting technique may be used. Weight factors (e.g., W1 . . . Wm) may be assigned to the wafers 220 based on the length of time the each wafer 220 has been in the queue. A random wafer 220 may then be selected based on the weight factors. Generally, wafers 220 with higher weight factors are more likely to be selected, however, the selection is still random.

Techniques for generating weighted random samples are known to those of ordinary skill in the art. A simplified example includes assigning integer weight factors and using a simple lottery approach. Each wafer has a number of entries equal to its integer weight factor. The selected entry thus represents a weighted random sample of the wafers. Of course, in an actual implementation, the weight factors will typically have a continuous range of values.

In addition to considering time in queue 200, a component of the weight factor may also be dependent on the priority of the wafer 220. For example, the weight factor may be expressed as:

$$Wm = W_T + W_P.$$

A first weight factor may be based on time in queue 200 and a second weight factor may be based on priority. Hence, as the time in queue increases, a wafer will be more likely to be picked, even if it results in picking a wafer with a lower priority.

In another example, the time based weight factor may be multiplied by a priority-based scaling factor to favor higher priority wafers 220:

$$Wm = K_p * W_T.$$

Based on the weight factors, a weighted random selection may be used to select the next wafer for dispatch (e.g., the wafer B2). The weight factors may be updated for each dispatch decision.

The assigning of weight factors described with reference to FIG. 4 may be implemented with or without the window 230 of FIG. 2. For example, the window 230 of wafers 220 entering the queue 200 within a particular time interval may be defined. Weighting factors may then be assigned based on the time in queue 200 and/or the relative priorities as described with reference to FIG. 4. A weighted random selection may be used to select the next wafer 220 for dispatch from within the window 230. The use of a window 230 reduces the number of wafers 220 for which weight factors need to be determined and also results in the queue 200 operating more like a FIFO queue. Without a window 230, the most recent wafer 220 to enter the queue 200 could conceivably be dispatched. Again, the size of the time interval for defining the window 230 may vary depending on the particular implementation, and the frequency at which the window 230 may be updated may also vary.

Figure 5:
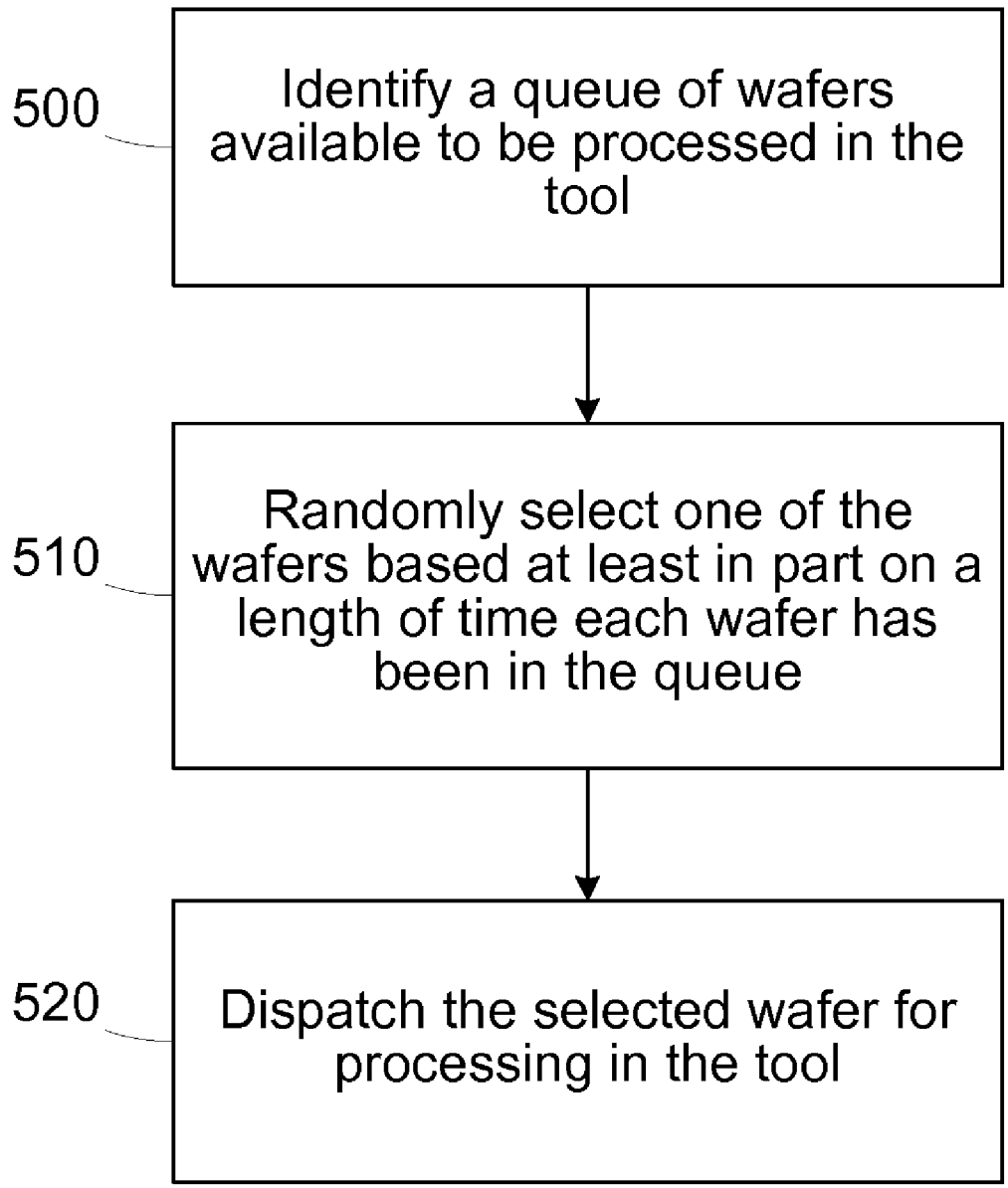
FIG. 5 is a simplified flow diagram of a method for dispatching wafers for processing in a tool.

FIG. 5 illustrates a simplified flow diagram of a method for dispatching wafers for processing in a tool. In method block 500, a queue of wafers available to be processed in the tool is identified. In method block 510, one of the wafers is randomly selected based at least in part on a length of time each wafer has been in the queue. In method block 520, the selected wafer is dispatched for processing in the tool.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method for dispatching wafers for processing in a tool, comprising:

identifying a queue of wafers available to be processed in the tool;

randomly selecting one of the wafers based at least in part on a length of time each wafer has been in the queue; and
dispatching the selected wafer for processing in the tool.

2. The method of claim 1, further comprising:
generating a weight factor for each wafer in at least a subset of the wafers, the weight factor including a first component determined based on the length of time the associated wafer has been in the queue; and
randomly selecting one of the wafers from the subset based on the weight factors.

3. The method of claim 2, wherein generating the weight factor comprises generating a second component based on a relative priority of the associated wafer.

4. The method of claim 3, further comprising adding the first and second components to generate the weight factor.

5. The method of claim 3, further comprising multiplying the first and second components to generate the weight factor.

6. The method of claim 1, further comprising:
selecting a subset of wafers in a queue of wafers available to be processed in the tool based on the length of time each wafer has been in the queue; and
randomly selecting one of the wafers in the subset for dispatching to the tool.

7. The method of claim 6, further comprising:
updating the selected subset after dispatching the selected wafer; and
randomly selecting a subsequent wafer from the updated subset.

8. The method of claim 6, wherein selecting the subset further comprises:
defining a window based on a time interval; and
adding wafers that entered the queue within the window to the subset.

9. A manufacturing system, comprising:
a tool operable to process wafers;
a workflow unit operable to identify a queue of wafers available to be processed in the tool, randomly select one of the wafers based at least in part on a length of time each wafer has been in the queue, and dispatch the selected wafer for processing in the tool.

10. The system of claim 9, wherein the workflow unit is further operable to further generate a weight factor for each wafer in at least a subset of the wafers, the weight factor including a first component determined based on the length of time the associated wafer has been in the queue, and randomly select one of the wafers from the subset based on the weight factors.

11. The system of claim 10, wherein the workflow unit is further operable to generate a second component of the weight factor based on a relative priority of the associated wafer.

12. The system of claim 11, wherein the workflow unit is further operable to add the first and second components to generate the weight factor.

13. The system of claim 11, wherein the workflow unit is further operable to multiply the first and second components to generate the weight factor.

14. The system of claim 9, wherein the workflow unit is further operable to select a subset of wafers in a queue of wafers available to be processed in the tool based on the length of time each wafer has been in the queue and randomly select one of the wafers in the subset.

15. The system of claim 14, wherein the workflow unit is further operable to update the selected subset after dispatching the selected wafer and randomly select a subsequent wafer from the updated subset for dispatching to the tool.

16. The system of claim 14, wherein the workflow unit is further operable to define a window based on a time interval and add wafers that entered the queue within the window to the subset.

17. A system, comprising:
means for identifying a queue of wafers available to be processed in a tool;
means for randomly selecting one of the wafers based at least in part on a length of time each wafer has been in the queue; and
means for dispatching the selected wafer for processing in the tool.

* * * * *